United States Patent
Kawaguchi et al.

(10) Patent No.: US 9,841,100 B2
(45) Date of Patent: Dec. 12, 2017

(54) SHIFT POSITION SWITCHING CONTROLLER

(71) Applicant: DENSO CORPORATION, Kariya, Aichi-pref. (JP)

(72) Inventors: Yuusaku Kawaguchi, Nagoya (JP); Kazuhiro Yoshida, Tokoname (JP)

(73) Assignee: DENSO CORPORATION, Kariya (JP)

(*) Notice: Subject to any disclaimer, the term of this patent is extended or adjusted under 35 U.S.C. 154(b) by 259 days.

(21) Appl. No.: 14/726,808

(22) Filed: Jun. 1, 2015

(65) Prior Publication Data

US 2015/0345627 A1    Dec. 3, 2015

(30) Foreign Application Priority Data

Jun. 2, 2014  (JP) .................. 2014-114427

(51) Int. Cl.
| | | |
|---|---|---|
| *F16H 61/18* | (2006.01) | |
| *F16H 61/02* | (2006.01) | |
| *F16H 59/44* | (2006.01) | |
| *F16H 61/32* | (2006.01) | |

(52) U.S. Cl.
CPC ......... *F16H 61/18* (2013.01); *F16H 61/0213* (2013.01); *F16H 59/44* (2013.01); *F16H 2061/326* (2013.01)

(58) Field of Classification Search
CPC .................. F16H 61/0213; F16H 61/18; F16H 2061/0234; F16H 2061/0241; F16H 59/02; F16H 59/0204; F16H 59/44; F16H 2059/0221
See application file for complete search history.

(56) References Cited

U.S. PATENT DOCUMENTS

| | | | |
|---|---|---|---|
| 2008/0039282 A1 | 2/2008 | Yoshiyama et al. | |
| 2008/0113848 A1* | 5/2008 | Inoue | F16H 61/12 477/98 |
| 2009/0111649 A1* | 4/2009 | Hecht | F16H 63/483 477/92 |
| 2009/0234530 A1* | 9/2009 | Takamatsu | F16H 61/12 701/31.4 |
| 2012/0123653 A1* | 5/2012 | Kimura | B60W 10/06 701/54 |

FOREIGN PATENT DOCUMENTS

| | | |
|---|---|---|
| JP | 7-253155 | 10/1995 |
| JP | 2008-002561 | 1/2008 |

* cited by examiner

*Primary Examiner* — Jacob S Scott
(74) *Attorney, Agent, or Firm* — Nixon & Vanderhye P.C.

(57) ABSTRACT

A shift position switching controller determines whether the responsiveness for switching the shift position to an other-than-N position will be affected by a reduction of an N position check time and keeps the N position check time unchanged from a normal value if a current shift position is a D position or if a vehicle speed is equal to or greater than a preset value. Alternatively, the shift position switching controller determines whether the responsiveness of the controller will be affected by reducing the N position check time, and sets the N position check time to a shorter-than-normal value if the current shift position is a D position and the vehicle speed is equal to or greater than the preset value.

4 Claims, 7 Drawing Sheets

FIG. 4A  N POS CHECK TIME NOT SHRINKED
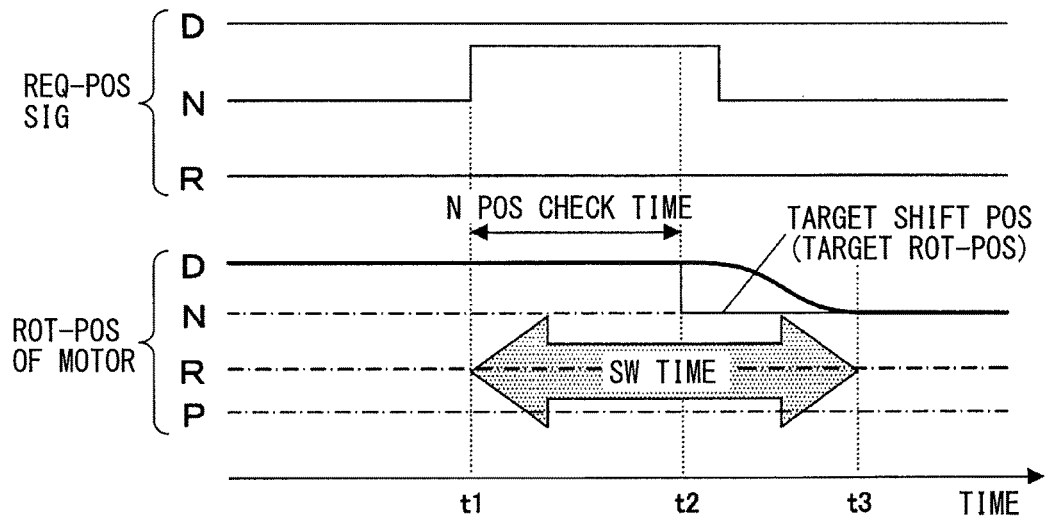
FIG. 4B  N POS CHECK TIME SHRINKED
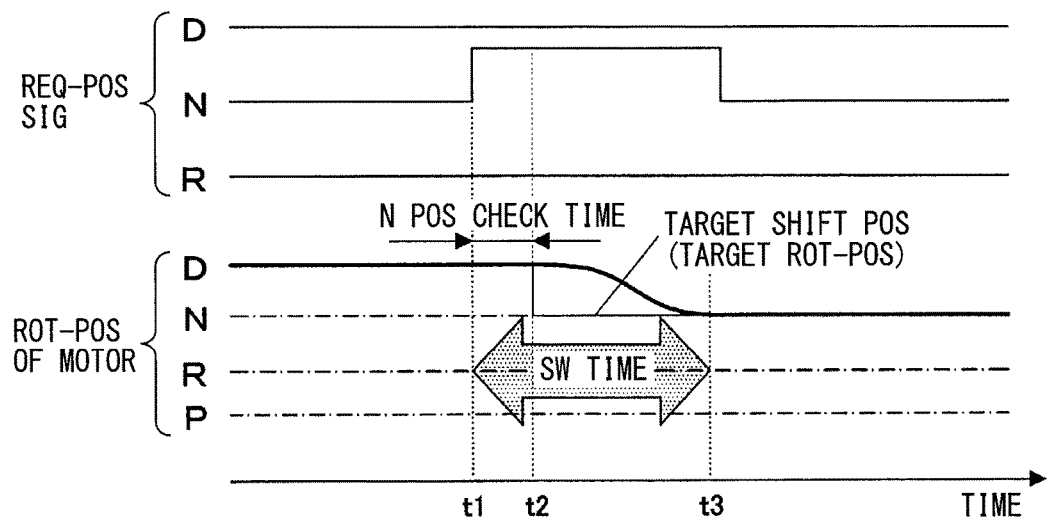

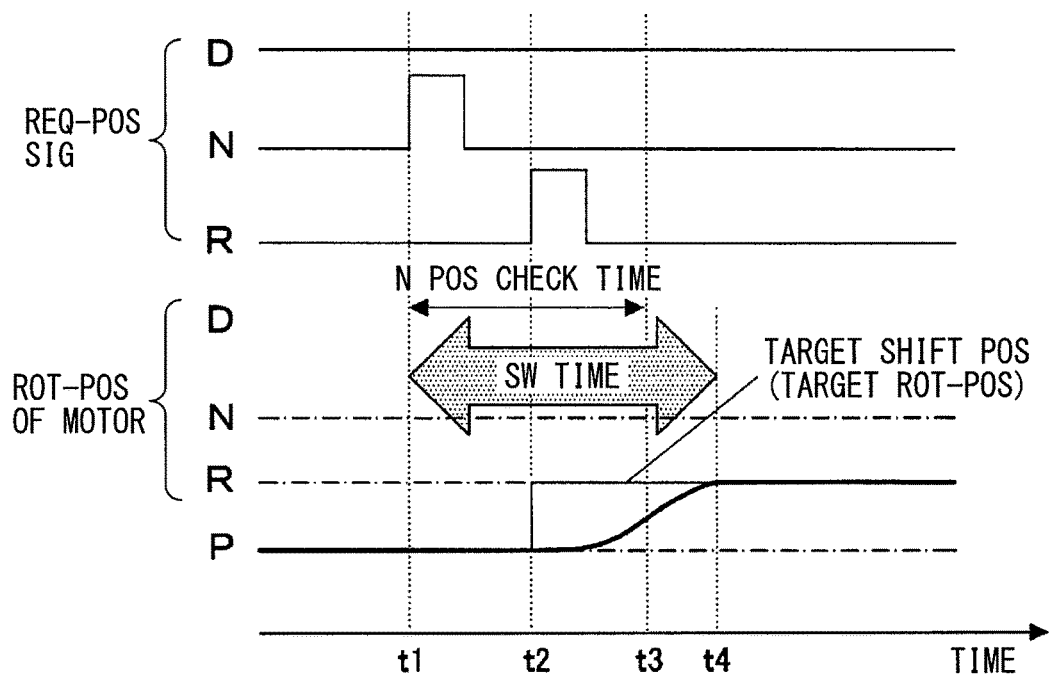
FIG. 5A  N POS CHECK TIME NOT SHRINKED
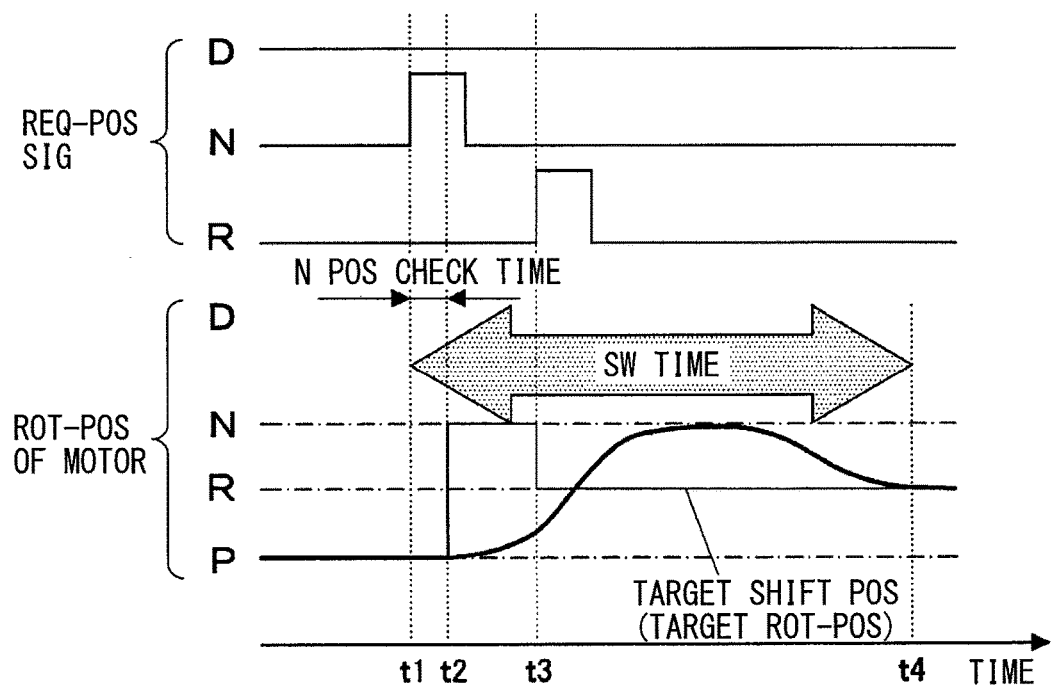
FIG. 5B  N POS CHECK TIME SHRINKED

SHIFT POSITION SWITCHING CONTROLLER

CROSS REFERENCE TO RELATED APPLICATION

The current application is based on and claims the benefit of priority of Japanese Patent Application No. 2014-114427, filed on Jun. 2, 2014, the disclosure of which is incorporated herein by reference.

TECHNICAL FIELD

The present disclosure generally relates to a shift position switching controller that switches shift positions using a motor.

BACKGROUND INFORMATION

In recent years, mechanical drive systems in vehicles have been gradually replaced by electrical drive-by-wire systems, in which components are driven by electric motors to improve space efficiency, assemblability, controllability, and the like. One example of such replacement may be found in a transmission shift position switching mechanisms. In such a system, when a target shift position is changed according to an operation of a shift control lever or the like, the shift position is controlled to be in the target shift position by rotating the motor to a target rotation position corresponding to the target shift position.

A shift position switching controller disclosed in a patent document 1 (i.e., Japanese Patent Application No.: JP 2008-2561 A) provides a pre-fetch control that pre-starts the switching of the shift position to an N position in order to reduce a shift position switch time, when the shift control lever passes an N lever position during the shift position switching, that is, at a moment of detecting that the shift control lever is in the N lever position without knowing which lever position is the target lever position.

The applicant of the present disclosure is now studying a shift position switching system that prevents a mis-shift to the N position, that is, a non-intended shift position switching to the N position. The shift position switching system is configured to perform a switching of the target shift position to the N position only when a request position signal is switched to an N position signal and continue to be an N position signal at least for a preset time, that is, at least after an N position check time.

In such a system, as shown in FIG. 4B, by reducing the N position check time, a required time between (i) the switching of the request position signal to the N position signal and (ii) the switching of the target shift position to the N position is reduced. In such manner, a switch time between (i) the switching of the request position signal to the N position signal and (ii) the rotation of the motor to the rotation position that corresponds to the N position (i.e., an actual switching of the shift position to the N position) is reduced in comparison to a conventional switch time that includes a not-reduced N position check time (cf. FIG. 4A).

However, by reducing the N position check time, the switch time may be extended in some cases. For example, as shown in FIG. 5A/B, such a reverse effect may be observed when the request position signal is switched to the R position signal immediately after (i.e., subsequent to) the switching to the N position signal. In such a case, as shown in FIG. 5B, soon after the switching of the request position signal to the N position signal, the target shift position is switched to the N position, and a rotation drive control of driving the motor to the "N shift rotation position" (i.e., abbreviated to "N shift" hereafter, representing a motor rotation position corresponding to the N position) is started, due to the reducing of the N position check time. Then, due to a further switching of the request position signal to the R position signal, the rotation drive control is switched to rotate the motor to the "R shift rotation position" (i.e., abbreviated to "R shift" hereafter, representing a rotation position corresponding to the R position). That is, the rotation drive control of the motor is switched, from the driving of the motor to the N shift to the driving of the motor to the R shift during the driving of the motor to the N shift, which causes an "overshoot" rotation, that is, the rotation position of the motor returns to the R shift after passing the R shift first to approach the N shift. Therefore, the switch time between (i) the switching of the request position signal to the N position signal and (ii) the driving of the motor to the N shift, i.e., to the rotation position corresponding to the N position (i.e., an actual switching of the shift position to the N position) is extended in comparison to a conventional switch time that includes a no-reduced the N position check time (see FIG. 5A). That is, responsiveness of the switching of the shift position to the R position is deteriorated.

SUMMARY

It is an object of the present disclosure to provide a shift position switching controller that reduces a shift position switch time to the N position while maintaining switching responsiveness to positions other than the N position.

In an aspect of the present disclosure, the shift position switching controller includes a position switch mechanism switching among plural shift positions via a drive source power from a motor, a shift position selector outputting a request position signal according to an operation of an operation unit, and a controller switching the shift position to a target shift position according to the request position signal based on a rotation control of the motor to rotate to a target rotation position that corresponds to the target shift position. The controller sets an N position check time according to a current shift position and a vehicle speed, and when the request position signal is switched to an N position signal, the controller switches the target shift position to an N position only when the N position signal continues for at least the N position check time.

In another aspect of the present disclosure, the controller sets the N position check time to be shorter than a normal value when the current shift position is a D position and the vehicle speed is equal to or greater than a preset value.

In yet another aspect of the present disclosure, when the request position signal switches to the D position signal, the controller switches the target shift position to the D position immediately when the request position signal switches to the D position signal, and when the request position signal switches to the R position signal, the controller switches the target shift position to the R position immediately when the request position signal switches to the R position signal.

In a further aspect of the present disclosure, the shift position selector includes a home state in which no shift position switching is requested by the request position signal, and when the request position signal switches from the D position signal to the R position signal without passing the home state, the controller ignores the R position signal, and when the request position signal switches from the R position signal to the D position signal without passing the home state, the controller ignores the D position signal.

In the above-described configuration, the switching of the target shift position to the N position happens only after the N position check time from the switching of the request position signal to the N position signal. That is, the N position signal has to continue, i.e., to be kept unchanged, for the N shift check time. In such manner, a mis-shift of mistaken switching of the shift position to the N position is prevented.

In the above configuration, the controller determines whether the responsiveness of the switching of the shift positions will be deteriorated if the N position check time is reduced based on the current shift position or based on the current travel speed of the vehicle. That is, the N position check time is set based on the current shift position and the travel speed of the vehicle. In such manner, if it is determined that the switching is likely to suffer from the deteriorated responsiveness if the N position check time is reduced, the N position check time may be left untouched/un-reduced. On the other hand, if it is determined that the switching of the shift position will not substantially suffer from the deteriorated responsiveness even if the N position check time is reduced, the N position check time may be reduced. Therefore, in other words, the shift position switch time to the N position is reduced while maintaining the responsiveness of the switching of the shift position to the other positions other than N position.

BRIEF DESCRIPTION OF THE FIGURES

Objects, features, and advantages of the present disclosure will become more apparent from the following detailed description made with reference to the accompanying figures, in which:

FIG. 4A is a comparative illustration of an N shift switch time;

FIG. 4B is a comparative illustration of an N shift switch time;

FIG. 5A is a comparative illustration of an R shift switch time;

FIG. 5B is a comparative illustration of an R shift switch time;

DETAILED DESCRIPTION

One example implementation of the present disclosure is hereafter described.

Figure 1:
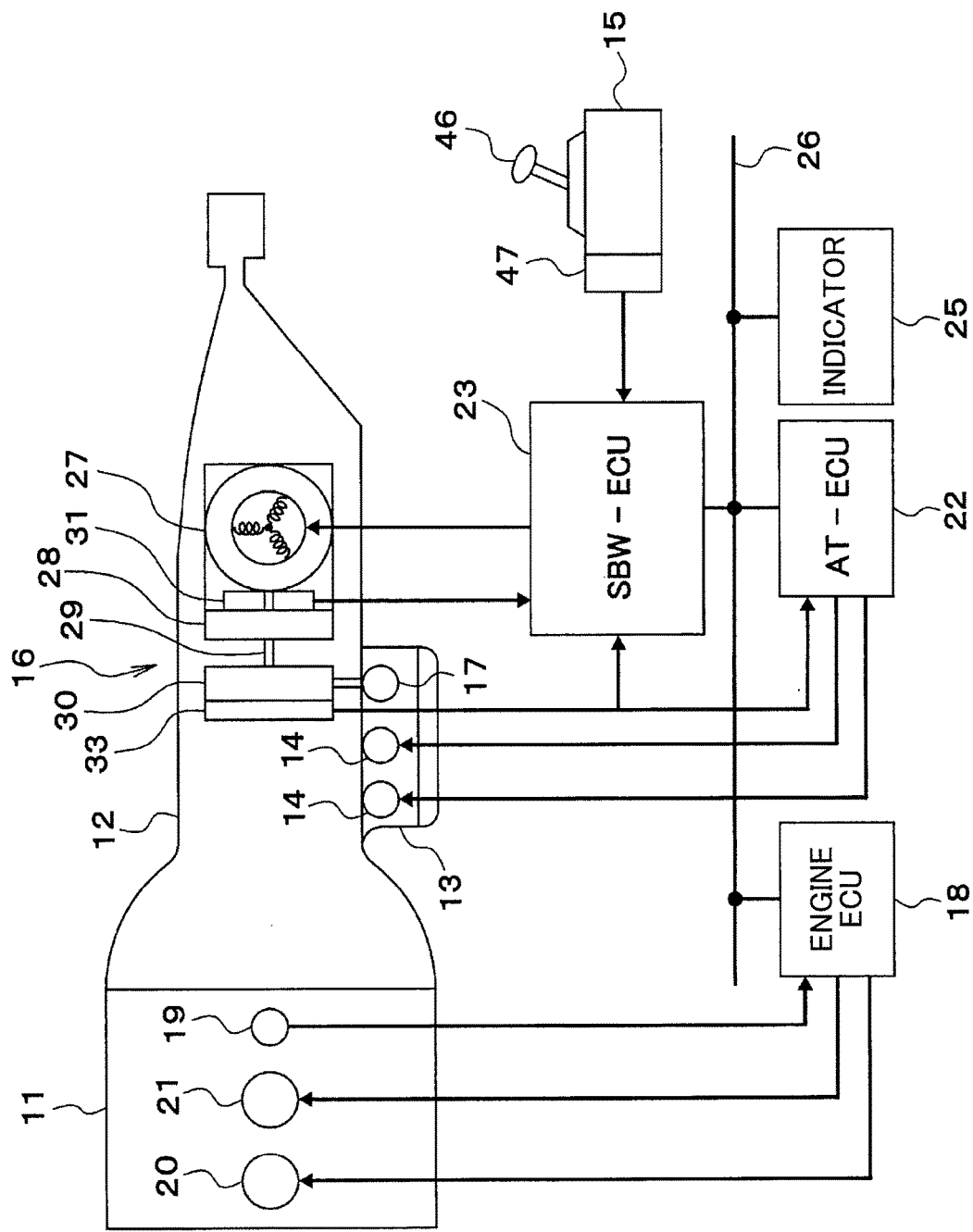
FIG. 1 is a block diagram of an automatic transmission control system of the present disclosure.

First, based on FIG. 1, an outline configuration of an automatic transmission controller system in vehicles is described.

The input shaft of an automatic transmission 12 is connected with the output shaft (i.e., a crankshaft) of an engine 11. The automatic transmission 12 is provided with the speed change gear mechanism (not shown) and a hydraulic control circuit 13. The speed change gear mechanism is provided with the friction engagement elements (not shown), such as plural clutches for switching a gear (i.e., for switching a gear ratio) and a brake. Further, the hydraulic control circuit 13 is provided with an oil pressure control valve 14 which controls the oil pressure applied to the friction engagement elements and a manual valve 17 which switches the hydraulic fluid circuit of the friction engagement elements. The manual valve 17 is driven by a position switching mechanism 16 according to a shift operation of a shift position selector 15.

An engine ECU 18 for controlling the engine 11 controls the throttle opening of a throttle device 20 (i.e., an opening degree of a throttle valve), the fuel injection amount of a fuel injection valve 21, etc. based on the output signal of an accelerator sensor 19 which detects an accelerator opening (i.e., an operation amount of an accelerator pedal), for example. Hereafter, "ECU" means an "electronic control unit".

An AT-ECU 22 for controlling the shift operation of the automatic transmission 12 switches the gear ratio of the automatic transmission 12 to a target gear ratio by controlling the oil pressure supplied to each of the friction engagement elements based on the control of the switching action of each of the oil pressure control valves 14 of the hydraulic control circuit 13.

An SBW-ECU 23 for controlling the shift position switch operation of the automatic transmission 12 controls a motor 27 of the position switching mechanism 16 based on a request position signal according to an operation of a control lever 46 (i.e., an operation unit in the claims) of the shift position selector 15. Thereby, the shift position of the automatic transmission 12 is switched by controlling the switch operation of the manual valve 17 according to a driver's shift position switching operation.

A shift-by-wire (SBW) system comprises the shift position selector 15, the position switching mechanism 16, and the SBW-ECU 23 described above, together with other parts.

The engine ECU 18, the AT-ECU 22, and the SBW-ECU 23 are connected with an indicator 25 and other parts via a communication line 26, which may be an in-vehicle LAN or the like, and they exchange required information by CAN communication or the like. Further, the output signal (i.e., a request position signal in the claims) of the shift position selector 15 may be input to the SBW-ECU 23 either directly or indirectly, i.e., either via the AT-ECU 22 or not via the AT-ECU 22.

Figure 2:
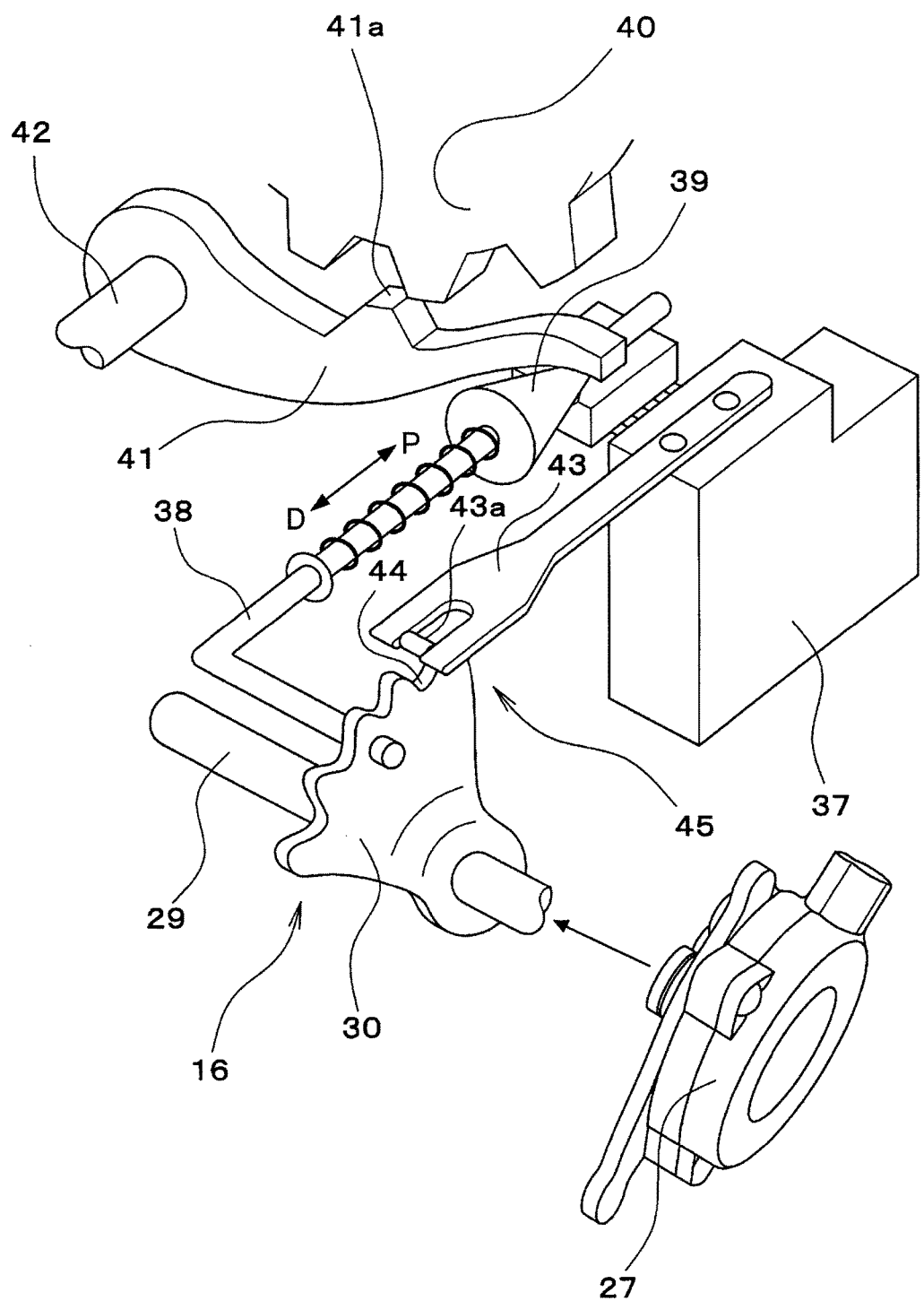
FIG. 2 is a perspective view of a shift position switching mechanism.

As shown in FIG. 2, the position switching mechanism 16 switches the shift position of the automatic transmission 12 to four positions, i.e., either to a P position (i.e., a parking position), to an R position (i.e., a reverse position), to an N position (i.e., a neutral position), or to a D position (i.e., a drive position).

The motor 27 used as a drive power source of the position switching mechanism 16 is implemented as a switched-reluctance motor, for example. The revolving shaft of the motor 27 is connected with a manual shaft 29 via a deceleration mechanism 28 (refer to FIG. 1), and a detent lever 30 is fixed to the manual shaft 29. The manual valve 17 (refer to FIG. 1) which linearly moves according to a rotation of the detent lever 30 is connected to the detent lever 30, and the shift position is switched according to the switching of the hydraulic circuit of the automatic transmission 12 by such move of the manual valve 17. Therefore, the shift position of the automatic transmission 12 is controlled/controllable according to the rotation angle of the motor 27.

A parking rod 38 having an L shape is fixed to the detent lever 30, and a cone 39 provided at a tip of the parking rod 38 is in contact with a locking lever 41. The locking lever 41 moves up and down centering on a shaft 42 according to the position of the cone 39, for locking and unlocking of a parking gear 40.

The parking gear 40, which is disposed on the output shaft of the automatic transmission 12, is locked by the locking lever 41 for holding a drive wheel of the vehicle in a non-rotatable state (i.e., in a parking state).

On the other hand, the detent spring 43 for holding the detent lever 30 in each of the P, R, N, D positions is fixed to a supporting base 37, and each of position holding concaves 44 respectively corresponding to the P, R, N, and D positions are formed on the detent lever 30.

When an engagement part 43a provided at the tip of the detent spring 43 fits/sinks into each of the position holding concaves 44 of the detent lever 30, the detent lever 30 is held in one of those positions.

A detent mechanism 45 (i.e., a detent) for engagingly holding a rotation position of the detent lever 30 at the positions that correspond to respective shift positions (i.e., the position switching mechanism 16 is held in respective shift positions) comprises the detent lever 30 and the detent spring 43 described above.

In the P position, the parking rod 38, moving closer to the locking lever 41, drives a thick portion of the cone 39 to push up a locking lever 41, and a convex part 41a of the locking lever 41 engages the parking gear 40 and holds the parking gear 40 in a locked state, thereby putting the output shaft of the automatic transmission 12 in a locked state (i.e., holding the drive wheel in a locked state).

On the other hand, in positions other than the P position, the parking rod 38 moves away from the locking lever 41, and the thick portion of the cone 39 pulled out from the locking lever 41, and the convex part 41a of the locking lever 41 disengages from the parking gear 40 and releases the lock of the parking gear 40, thereby putting the output shaft of the automatic transmission 12 in a rotatable state, i.e., the vehicle is put in a travelable state.

As shown in FIG. 1, an encoder 31 is attached to the motor 27 as a rotation angle sensor for detecting the rotation angle (i.e., a rotation position) of a rotor. The encoder 31 is constituted as a rotary encoder of the magnetic type, for example, so that a pulse signal is output to the SBW-ECU 23 at a given angle synchronizing with the rotation of the rotor of the motor 27.

The SBW-ECU 23 drives, i.e., rotates, the motor 27 by counting the pulse signals of the encoder 31 and switching the power supply phase of the motor 27 in a predetermined order. Since the shift position of the automatic transmission 12 changes according to the rotation angle of the motor 27 as mentioned above, the encoder count, i.e., a value representing the number of pulse signals output from the encoder 31, indirectly represents an actual shift position of the position switching mechanism 16.

Further, a rotation sensor 33 which detects the rotation angle (i.e., a rotation position) of the manual shaft 29 or the detent lever 30 is provided. The rotation sensor 33 is constituted by a sensor (e.g., a potentiometer) which outputs the voltage according to the rotation angle of the manual shaft 29 or the detent lever 30. Based on the output voltage from the rotation sensor 33, an actual shift position is confirmed as to which one of the P position, the R position, the N position, and the D position the shift position actually is.

The shift position selector 15 is provided with the control lever 46 for a driver to choose a shift position and a selector sensor 47 which outputs a request position signal according to the shift operation of the control lever 46 for choosing a shift position.

Figure 3:
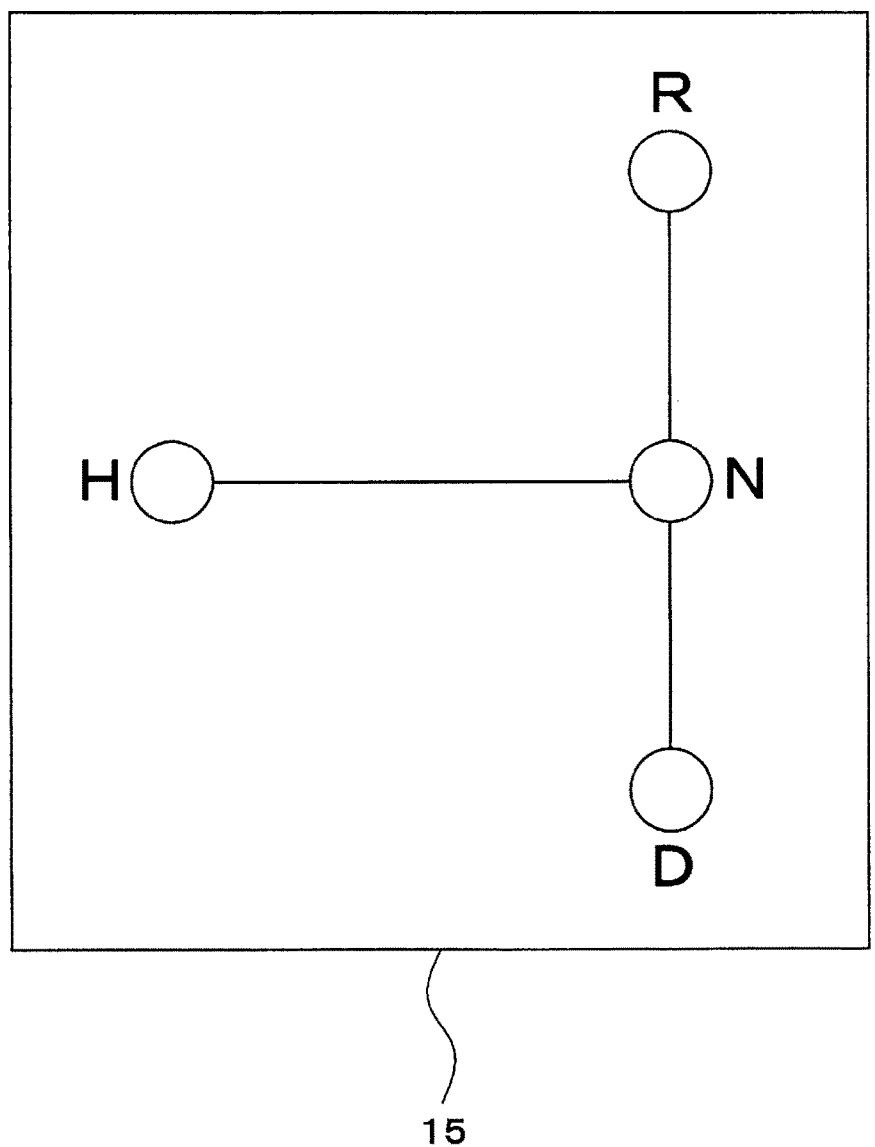
FIG. 3 is an illustration of an operation pattern of a shift position selector.

As shown in FIG. 3, biasing of the control lever 46 of the shift position selector 15 is performed toward an H position (i.e., a home position) by a biasing means of a spring etc., and is switchable from the H position to other positions, i.e., to the N position, the R position, and the D position. When operating the control lever 46 from the H position either to the R position or to the D position, the control lever 46 passes through the N position.

When the control lever 46 is operated either to the N position, to the R position, or to the D position, the request position signal output from the selector sensor 47 of the shift position selector 15 switches either to an N position signal, to an R position signal, or to a D position signal, and when the control lever 46 returns to the H position, the request position signal switches back to a home state in which no shift position switching is performed. Further, when a P position switch which is not illustrated is operated, the request position signal output from the P position switch (or from the selector sensor 47) switches to a P position signal.

The SBW-ECU 23 switches a target shift position according to the request position signal output from the shift position selector 15 (i.e., from the selector sensor 47), and, when the motor 27 is rotated to a target rotation position (i.e., to a target count) based on the encoder count that corresponds to a target shift position, a shift position is switched to a target shift position.

When the request position signal switches to the N position signal at such time of signal switching, a mis-shift to the N position is prevented by switching the target shift position to the N position only after a continuation of the N position signal at least for a preset time, i.e., at least for an N position check time.

In such a system, as shown in FIG. 4B, a signal switch time from t1 to t2, i.e., from a signal switch timing t1 of switching the request position signal to the N position signal to a position switch timing t2 of switching of the target shift position to the N position, is reduced by reducing the N position check time. Thus, a shift switch time from t1 to t3, i.e., from the signal switch timing t1 to a rotation reach timing t3 at which the rotation position of the motor 27 actually reaching a position that corresponds to the N position, is reduced in comparison to the one in a N position check time not reduced case, which is shown in FIG. 4A.

However, reducing of the N position check time may have a "reverse effect," i.e., the shift switch time may be extended due to the reducing of the N position check time.

Please now refer to an example shown in FIGS. 5A and 5B, in which immediately after the switching of the request position signal to the N position signal, the request position signal is further switched to the R position signal.

In the above example, if the N position check time is reduced (i.e., from the time in FIG. 5A to the time in FIG. 5B), at timing t2 soon after the switching of the request position signal to the N position signal, the switching of the target shift position to the N position happens, which is a start of a control N for rotating the motor 27 toward the N shift (i.e., a rotation of the motor 27 to a rotation position corresponding to the N position).

Then, at timing t3 of the switching of the request position signal to the R position signal, the target shift position switches to the R position, thereby switching the above-described control N to a control R for rotating the motor 27 toward the R shift (i.e., a rotation of the motor 27 to a rotation position corresponding to the R position).

In such case, the switching of the control N to the control R during the rotation of the motor 27 causes a "round trip" or a "detour" of the rotation position, i.e., the rotation position of the motor 27 already passing the R shift first to approach the N shift reversely turned to rotate back to the R shift. Therefore, the switch time from t1 to t4 at which the rotation position of the motor 27 actually reaches the R shift is extended in comparison to the switch time in a N position check time not reduced case, which is shown in FIG. 5A. In other words, the responsiveness of the switching to the R shift position is deteriorated due to the reducing of the N position check time.

Thus, in the present embodiment, each of the routines of FIGS. 6 and 7 mentioned later in detail is executed by the SBW-ECU 23 (i.e., a controller in the claims) (i) for setting the N position check time according to a current shift position and travel speed, and, when the request position signal switches to the N position signal, (ii) for switching the target shift position to the N position after the continuation of the N position signal at least for the N position check time.

Whether, when the N position check time is reduced, it is determined whether a possibility that the responsiveness of the switching of the shift position to a position other than the N position deteriorates is high based on the current shift position and the current travel speed. In view of such characteristics, the N position check time is set according to the current shift position and the current travel speed. In such manner, if it is determined that, when the N position check time is reduced, the possibility that the responsiveness of the switching of the shift position to a position other than the N position deteriorates is high, the N position check time is not reduced, in configuration. On the other hand, if it is determined that, even when the N position check time is reduced, the possibility that the responsiveness of the switching of the shift position to a position other than the N position deteriorates is low, the N position check time is reduced, in configuration.

More practically, when the current shift position is the D position and the current travel speed is equal to or greater than a preset value, the N position check time is reduced from a normal value (i.e., set to be shorter than the normal check time). That is, when the current shift position is the D position and the current travel speed is equal to or greater than a preset value (i.e., when the vehicle is traveling forward at the preset travel speed or higher), there is little chance of switching the shift position to the R position or to the P position. Therefore, by setting the N position check time to a value shorter than a normal value when the current shift position is the D position and the travel speed is equal to or greater than a preset value, the switch time to the N position is reduced without causing the deterioration of the responsiveness of the switching of the shift position to a position other than the N position.

Further, in the present embodiment, when the request position signal switches to the D position signal, the target shift position is configured to be switched to the D position at a timing of such switching to the D position signal, and when the request position signal switches to the R position signal, the target shift position is configured to be switched to the R position at a timing of such switching to the R position signal.

Further, in the present embodiment, when a D-R direct switching is performed in which the request position signal switches from the D position signal to the R position signal without passing the home state (i.e., when the control lever 46 is operated to the R position from the D position without staying at the H position), the R position signal in such a situation is ignored.

On the other hand, when an R-D direct switching is performed in which the request position signal switches from the R position signal to the D position signal without passing the home state (i.e., when the control lever 46 is operated to the D position from the R position without staying at the H position), the D position signal in such a situation is ignored.

Figure 6:
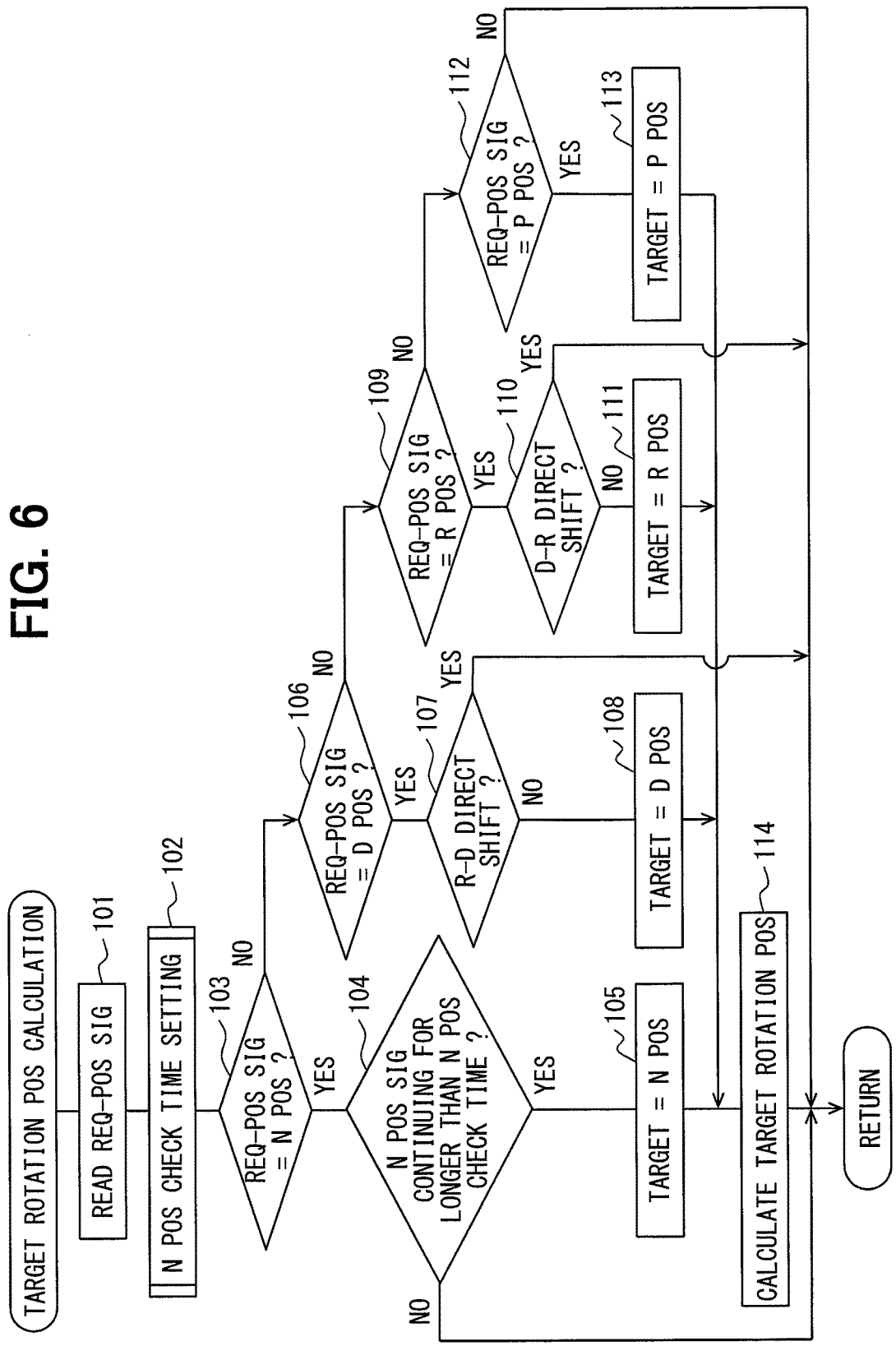
FIG. 6 is a flowchart of a target rotation position calculation routine.
Figure 7:
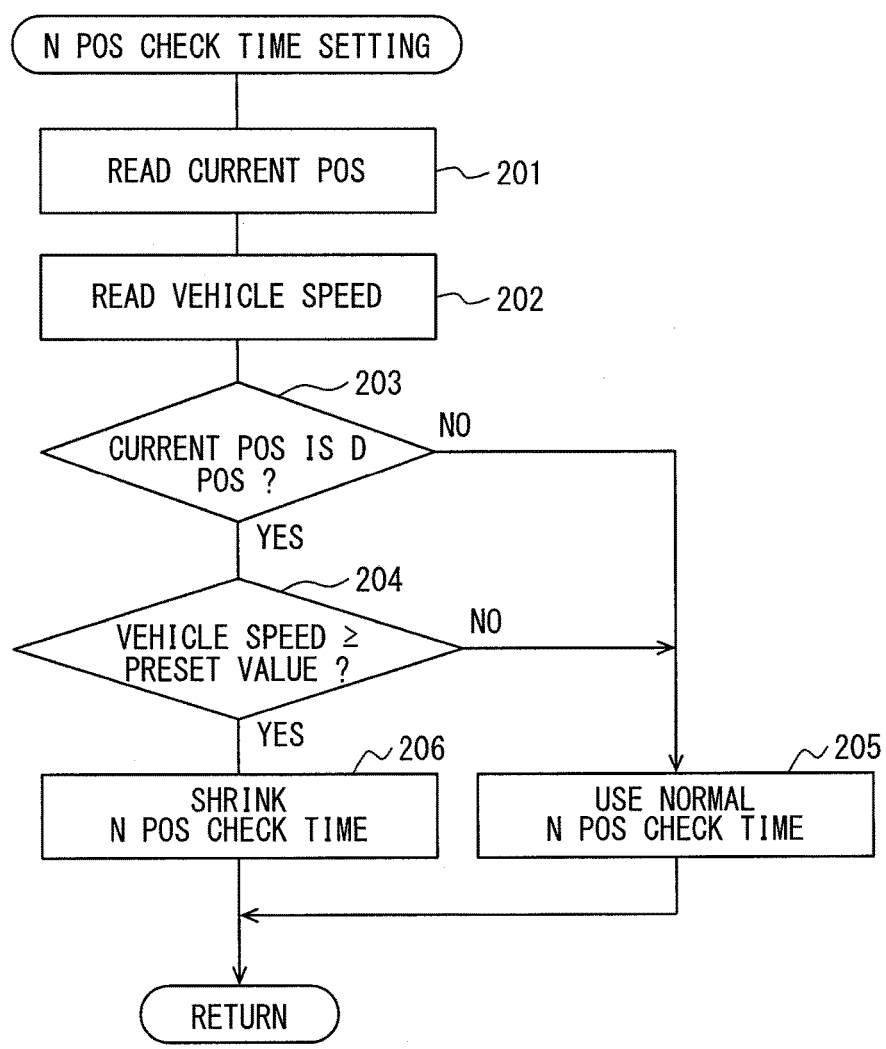
FIG. 7 is a flowchart of an N position check time setting routine.

Hereafter, the contents of processing of each of the routines of FIGS. 6 and 7 which are executed by the SBW-ECU 23 in the present embodiment are described.

(Target Rotation Position Calculation Routine)

The target rotation position calculation routine shown in FIG. 6 is repeatedly performed at given intervals during the power ON period of the SBW-ECU 23. When the routine is started, the routine reads first, at Step 101, the request position signal output from the shift position selector 15 (i.e., from the selector sensor 47).

Then, proceeding to Step 102, the routine sets the N position check time by performing an N position check time setting routine of FIG. 7 that is mentioned later.

Then, the routine proceeds to Step 103, and it is determined whether the request position signal is the N position signal. When it is determined that the request position signal is the N position signal at Step 103, the routine proceeds to Step 104 for determining whether the N position signal has continued at least for the N position check time. When it is determined that the N position signal has not continued at least for the N position check time, the routine is finished without switching the target shift position.

If, at the above-mentioned Step 104, it is determined that the N position signal has continued at least for the N position check time, the routine proceeds to Step 105, and the target shift position is set to the N position. In such manner, when the request position signal switches to the N position signal and the N position signal continues for a time longer than the N position check time, the target shift position is switched to the N position.

On the other hand, when it is determined that the request position signal is not the N position signal at the above-mentioned Step 103, the routine proceeds to Step 106, and it is determined whether the request position signal is the D position signal.

When it is determined that the request position signal is the D position signal at Step 106, proceeding to Step 107, and it is determined whether the R-D direct switching is performed in which the request position signal switches from the R position signal to the D position signal without passing the home state.

At Step 107, when it is determined that the R-D direct switching is not performed, the routine proceeds to Step 108 and the target shift position is set to the D position. In such manner, when the request position signal switches to the D position signal, the target shift position is switched to the D position at a timing of such switching to the D position signal. That is, the target shift position is switched to the D position immediately when the request position signal switches to the D position signal.

On the other hand, when it is determined that the R-D direct switching is performed at the above-mentioned Step 107, this routine is finished without switching the target shift position, i.e., by ignoring the request position signal (i.e., ignoring the D position signal).

On the other hand, when it is determined that the request position signal not is the D position signal at the above-mentioned Step 106, the routine proceeds to Step 109, and it is determined whether the request position signal is the R position signal.

When it is determined that the request position signal is the R position signal at Step 109, proceeding to Step 110, and it is determined whether the D-R direct switching is performed, in which the request position signal switches from the D position signal to the R position signal without passing the home state.

At Step 110, when it is determined that the D-R direct switching is not performed, the routine proceeds to Step 111, and the target shift position is set to the R position. In such manner, when the request position signal switches to the R position signal, the target shift position is switched to the R position at a timing of such switching to the R position signal. That is, the target shift position is switched to the R position immediately when the request position signal switches to the R position signal.

On the other hand, when it is determined that the D-R direct switching is performed at the above-mentioned Step 110, this routine is finished without switching the target shift position, i.e., by ignoring the request position signal (i.e., by ignoring the R position signal).

Further, when it is determined that the request position signal is not the R position signal at the above-mentioned Step 109, the routine proceeds to Step 112, and it is determined whether the request position signal is the P position signal. When it is determined that the request position signal is the P position signal at Step 112, the routine proceeds to Step 113, and the target shift position is set to the P position.

This routine is finished without switching the target shift position, when it is determined at the above-mentioned Step 112 that the request position signal is not the P position signal.

After setting the target shift position as mentioned above, the routine proceeds to Step 114, and the target rotation position (i.e., a target count) corresponding to the set-in-the-above target shift position is calculated.

(N Position Check Time Setting Routine)

The N position check time setting routine shown in FIG. 7 is a subroutine performed at Step 102 of the target rotation position calculation routine of FIG. 6.

First, if the routine is started, after reading the current position (i.e., the current shift position) at Step 201, the routine proceeds to Step 202, and the current travel speed of the vehicle is read.

Then, the routine proceeds to Step 203, and it is determined whether the current position is the D position.

When it is determined that the current position is not the D position at Step 203, it is determined (i.e., assumed) that the possibility that the responsiveness of the switching of the shift position to a position other than the N position deteriorates is high if the N position check time is reduced, and the routine proceeds to Step 205, and the N position check time is set to a normal value.

On the other hand, when it is determined that the current shift position is the D position at the above-mentioned Step 203, the routine proceeds to Step 204, and it is determined whether the travel speed of the vehicle is equal to or greater than a preset value.

When it is determined that the travel speed is lower than the preset value at Step 204, it is determined (i.e., assumed) that the possibility that the responsiveness of the switching of the shift position other than the N position deteriorates is high if the N position check time is reduced, and the routine proceeds to Step 205, and the N position check time is set to a normal value.

On the other hand, when it is determined that the current position is the D position at the above-mentioned Step 203 and it is determined that the travel speed is equal to or greater than the preset value at the above-mentioned Step 204, it is determined (i.e., assumed) that the possibility that the responsiveness of the switching of the shift position other than the N position deteriorates is low even if the N position check time is reduced, and the routine proceeds to Step 206, and the N position check time is set to a value shorter than the normal value.

In the present embodiment described above, when the current shift position is the D position or when the travel speed is not equal to or greater than (i.e., is lower than) the preset value, it is determined (i.e., assumed) that the possibility that the responsiveness of the switching of the shift position other than the N position deteriorates is high if the N position check time is reduced, and the N position check time is set to the normal value.

On the other hand, when the current shift position is the D position and the travel speed is equal to or greater than the preset value, it is determined (i.e., assumed) that the possibility that the responsiveness of the switching of the shift position to a position other than the N position deteriorates is low even if the N position check time is reduced, and the N position check time is set to a value shorter than the normal value. Thereby, the switch time to the N position is reduced, while securing (i.e., not deteriorating) the responsiveness of the switching of the shift position to a position other than the N position.

Further, in the present embodiment, when the request position signal switches to the D position signal, the target shift position is switched to the D position at a timing of such switching to the D position signal, and, when the request position signal switches to the R position signal, the target shift position is switched to the R position at a timing of such switching to the R position signal. In such manner, the responsiveness of the switching to the D position or to the R position is improved.

As mentioned above, when the D-R direct switching is performed in which the request position signal switches from the D position signal to the R position signal without passing the home state, if the target shift position is switched to the R position according to the request position signal in such D-R direct switching, the control D for the rotation of the motor 27 toward the D shift (i.e., to a rotation position corresponding to the D position) may possibly be switched, during such a rotation to the D shift, to the control R for the rotation of the motor 27 toward the R shift (i.e., to a rotation position corresponding to the R position).

Therefore, the switch time from the switching of the request position signal to the R position signal to the rotation position of the motor 27 actually reaches the R shift (i.e., a time required for actually switching a shift position to the R position) is extended, and the responsiveness of the switching to the R position may deteriorate.

On the other hand, when the R-D direct switching is performed in which the request position signal switches from the R position signal to the D position signal without passing the home state, if the target shift position is switched to the D position according to the request position signal in such R-D direct switching, the control R for the rotation of the motor 27 toward the R shift (i.e., to a rotation position corresponding to the R position) may possibly be switched, during such a rotation to the R shift, to the control D for the rotation of the motor 27 toward the D shift (i.e., to a rotation position corresponding to the D position).

Therefore, the switch time from the switching of the request position signal to the D position signal to the rotation position of the motor 27 actually reaches the D shift (i.e., a time required for actually switching a shift position to the D position) is extended, and the responsiveness of the switching to the D position may deteriorate.

Thus, in the present embodiment, when the D-R direct switching is performed in which the request position signal switches from the D position signal to the R position signal without passing the home state, the R position signal in such situation is ignored, and, when the R-D direct switching is performed in which the request position signal switches from the R position signal to the D position signal without passing the home state, the D position signal in such situation is ignored.

In such manner, when the D-R direct switching is performed in which the request position signal switches from the D position signal to the R position signal without passing the home state, by ignoring the R position signal in such situation, the target shift position is configured not to be switched to the R position. Therefore, the control D in the middle of the rotation of the motor 27 to the D shift is prevented from being switched to the other control, i.e., to the control R in this case, for the rotation of the motor 27 to the R shift (i.e., to a rotation position corresponding to the R position).

On the other hand, when the R-D direct switching is performed in which the request position signal switches from the R position signal to the D position signal without passing the home state, by ignoring the D position signal in such situation, the target shift position is configured not to be switched to the D position. Therefore, the control R in the middle of the rotation of the motor 27 to the R shift is prevented from being switched to the other control, i.e., to the control D in this case, for the rotation of the motor 27 to the D shift (i.e., to a rotation position corresponding to the D position).

Although the present disclosure has been fully described in connection with preferred embodiment thereof with reference to the accompanying drawings, it is to be noted that various changes and modifications will become apparent to those skilled in the art.

For example, in the above-mentioned embodiment, when the current shift position is the D position and the travel speed is equal to or greater than a preset value, the N position check time is reduced from the normal value. However, the condition for reducing the N position check time may be other than the above.

Further, in the above-mentioned embodiment, the present disclosure is applied to the shift position switching mechanism having four shift positions, i.e., P, R, N, D positions. However, the present disclosure may be applicable to other mechanisms, e.g., to the mechanism having three shift positions, or to the mechanism having five or more shift positions.

Further, the present disclosure is not only applicable to the automatic transmissions (i.e., AT, CVT, DCT, etc.), but may also be applicable to the shift position switching mechanism in the speed reducer of the electric vehicle, or other mechanisms, as long as the disclosure is applicable without losing the gist thereof.

Such changes, modifications, and summarized schemes are to be understood as is within the scope of the present disclosure as defined by appended claims.

What is claimed is:

1. A shift position switcher comprising:
a position switch mechanism switching among plural shift positions via a drive source power from a motor;
a shift position selector outputting a request position signal according to an operation of an operation unit; and
a controller switching the shift position to a target shift position according to the request position signal based on a rotation control of the motor to rotate to a target rotation position that corresponds to the target shift position, wherein
the controller sets an N position check time to a first value according to a current shift position and a vehicle speed, and
when the request position signal is switched to an N position signal, the controller switches the target shift position to an N position if the N position signal continues for at least the N position check time.

2. The shift position switcher of claim 1, wherein
the controller sets the N position check time to a second value when the current shift position is a D position and the vehicle speed is equal to or greater than a preset value, wherein the second value is less than the first value.

3. The shift position switcher of claim 1, wherein
when the request position signal switches to a D position signal, the controller switches the target shift position to a D position immediately when the request position signal switches to the D position signal, and
when the request position signal switches to an R position signal, the controller switches the target shift position to an R position immediately when the request position signal switches to the R position signal.

4. The shift position switcher of claim 1, wherein
the shift position selector includes a home state in which no shift position switching is requested by the request position signal, and
when the request position signal switches from a D position signal to an R position signal without passing the home state, the controller ignores the R position signal, and
when the request position signal switches from the R position signal to the D position signal without passing the home state, the controller ignores the D position signal.

* * * * *